United States Patent [19]

Rischke et al.

[11] Patent Number: 5,024,745
[45] Date of Patent: Jun. 18, 1991

[54] APPARATUS FOR TREATING STRIP-SHAPED ELEMENTS

[75] Inventors: Jorg W. Rischke, Veldhoven; Peter J. G. Loermans, Bergharen; Peter J. M. Huvenaars, Zeeland, all of Netherlands

[73] Assignee: MECO Equipment Engineers B.V., Hertogenbosch, Netherlands

[21] Appl. No.: 472,263

[22] Filed: Jan. 30, 1990

[30] Foreign Application Priority Data

Jan. 31, 1989 [NL] Netherlands ............ 8900229

[51] Int. Cl.$^5$ .............................. C25D 17/06
[52] U.S. Cl. ................................ 204/198
[58] Field of Search .............. 204/198, 202, 205

[56] References Cited

U.S. PATENT DOCUMENTS

| | | | |
|---|---|---|---|
| 2,942,719 | 6/1960 | Bofinger | 198/377 |
| 3,643,670 | 2/1972 | Sabatka et al. | 134/117 |
| 4,534,843 | 8/1985 | Johnson et al. | 204/224 R |

Primary Examiner—T. M. Tufariello
Attorney, Agent, or Firm—Oblon, Spivak, McClelland, Maier & Neustadt

[57] ABSTRACT

The invention relates to an apparatus provided with resilient clamping means for clamping strip-shaped elements onto the endless belt, in such a manner that the strip-shaped elements can be led through one or more treatment baths. The resilient clamping means are each connected at one end to the endless belt, and abut with their other free clamping end against the belt under the influence of their own resilience. Near one loading and/or unloading station the apparatus comprises means for pushing the free clamping ends of the clamping means in a direction away from the belt.

23 Claims, 13 Drawing Sheets

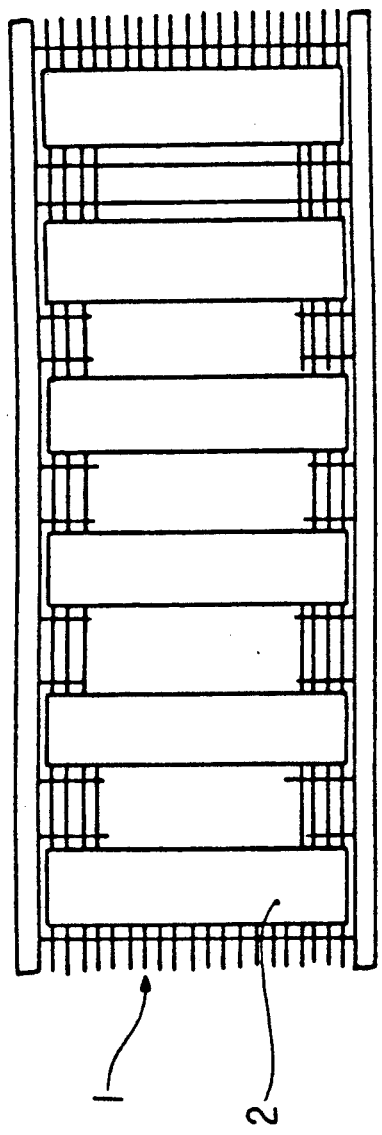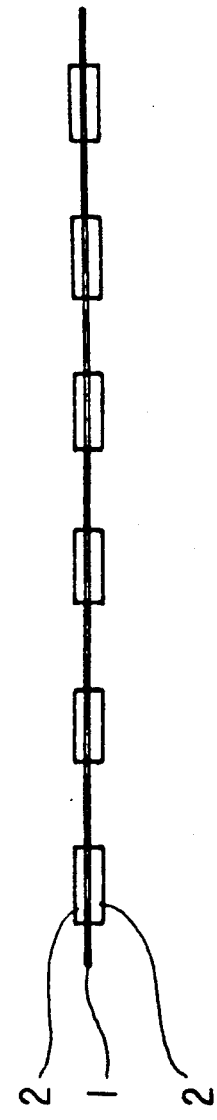
FIG.1
FIG.2

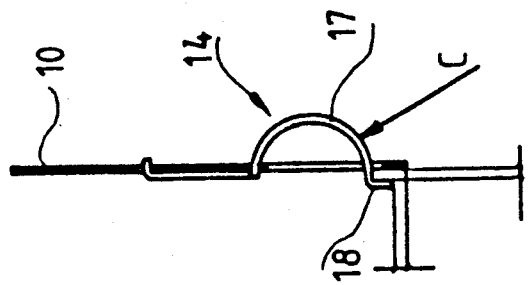
FIG.7
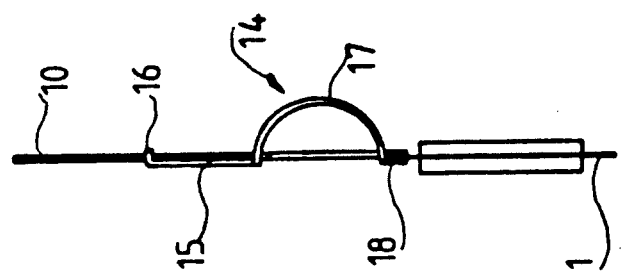
FIG.6
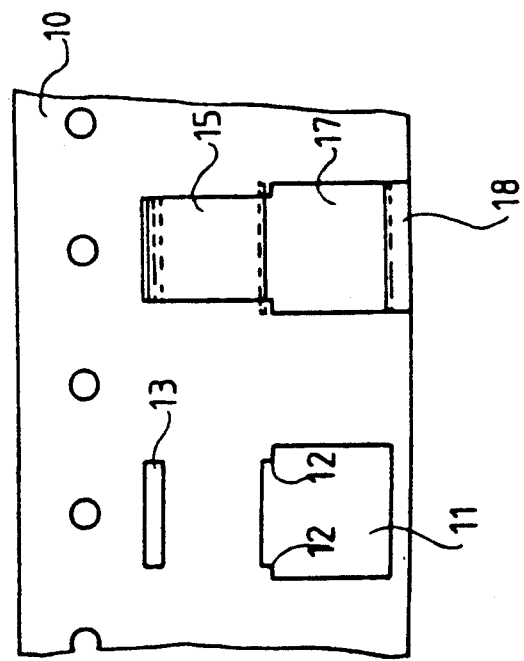
FIG.5
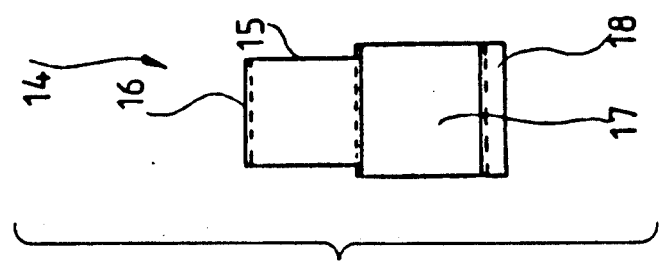

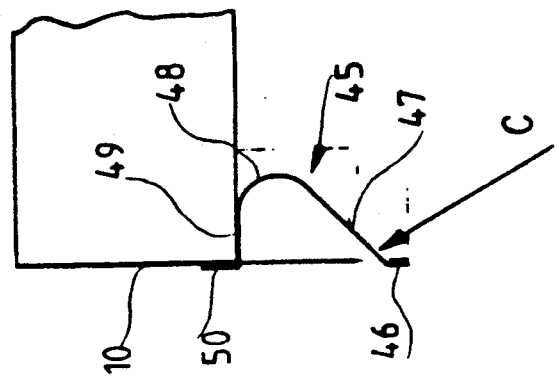
FIG.15
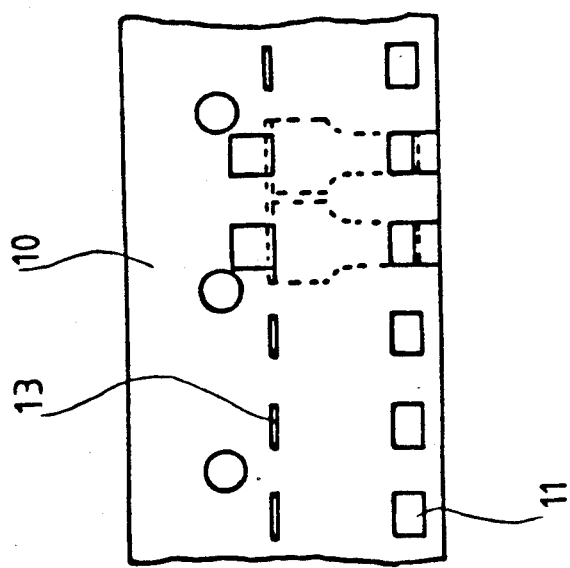
FIG.14
FIG.16
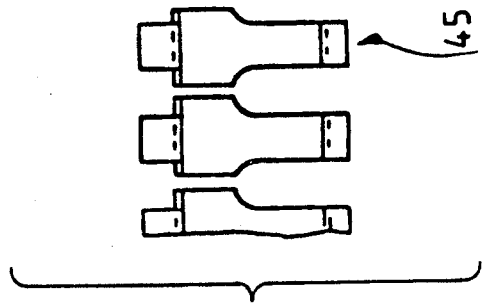

APPARATUS FOR TREATING STRIP-SHAPED ELEMENTS

The invention relates to an apparatus for treating strip-shaped elements, said apparatus being provided with an endless belt with resilient clamping means for clamping the strip-shaped elements onto the endless belt, in such a manner that the strip-shaped elements can be led through one or more treatment baths.

Such an apparatus is known from U.S. Pat. No. 4,534,843. In this known apparatus resilient fingers, being integral with the belt, are partially cut out of the belt, whereby the fIngers, which project underneath the part of the belt connecting the fingers, alternately make contact with opposed sides of an edge of a strip-shaped element. As a consequence of the fact that thus the resilient fingers alternately press on the edge of the strip-shaped element in opposed directions, deformations of the clamped edge of the strip-shaped element may occur, in particular with fragile products, which may interfere with the further treatment and/or use of the strip-shaped elements in question.

The object of the invention is to obtain an apparatus of the above kind, wherein said disadvantage of the known apparatus can be avoided.

According to the invention this object can be accomplished in that resilient clamping means are each connected at one end to the endless belt, and with their other free clamping end abut against the belt under the influence of their own resilience, whilst near one loading and/or unloading station the apparatus comprises means for pushing the free clamping ends of the clamping means in a direction away from the belt.

When using the construction according to the invention the clamped edge of a strip-shaped element can abut directly against, and be supported by, a part of the belt extending parallel to the relevant edge of the strip-shaped element; the relevant edge of the strip-shaped element being pressed against said part of the belt by means of the free clamping end of the relevant clamping means. Undesired deformations of the strip-shaped elements can be avoided in this manner.

It is noted that the term strip-shaped elements includes elements having a certain length as well as tape-like webs, which can e.g. be wound on and unwound from a reel.

From U.S. Pat. No. 3,643,670 there is furthermore known an apparatus for treating strip-shaped elements, said apparatus being provided with clamping means, which are provided with an arm having a fixed arrangement and a pivotal arm connected with said arm having a fixed arrangement by means of a hinge pin. Between the ends of the pivotal arms, which are directed away from the ends of the arms making contact with the strip-shaped elements, there are provided compression springs, which act to push together the ends of the arms gripping the strip-shaped elements.

By using arms which are pivotally provided by means of hinge pins and compression springs the construction of said apparatus is complicated, whilst the strip-shaped elements to be treated are only gripped locally by the arms and are not supported and guided by an endless belt along at least substantially their entire length.

Also U.S. Pat. No. 2,942,719 relates to an apparatus wherein strip-shaped elements can be gripped by the ends of arms which are pivotally coupled by means of hinge pins. The ends of the arms co-operating with the strip-shaped elements to be gripped are thereby pressed together by means of compression springs provided between opposed ends of the arms. The apparatus known from U.S. Pat. No. 2,942,719 has therefore the same disadvantages as the apparatus known from U.S. Pat. No. 3,643,670.

According to a further feature of the invention a clamping means has between its ends a part located at the side of the belt remote from the clamping end, said part comprising parts forming an angle with each other, whereby at least one of said parts projects through an opening provided in the belt, whilst the free clamping end of the resilient clamping means is formed by a part joining the part projecting through the opening, said part abutting against the belt.

By using such a construction it can be effected that when a force is exerted on the part of the clamping means which projects through the opening provided in the belt, the free clamping end of the resilient clamping means is pushed in a direction remote from the belt and is also moved in a direction parallel to the belt and towards the end of the relevant clamping means which is connected with the belt. An advantage of such a movement of the free clamping end of a clamping means relative to the belt when said clamping end is pushed in a direction remote from the belt is that as a result of this it is made possible in a simple manner to supply and/or discharge the strip-shaped elements in a direction parallel to the direction of movement of the belt at the location of the supply and/or discharge of the strip-shaped elements.

It is possible thereby to realise an adequate control of the deformation of a resilient clamping means, and with it of the movement of the free clamping end, when the end of the part of the clamping means which is directed away from the clamping means and which is located at the side of the belt remote from the clamping end, is wider than a part joining said part, which is connected with the belt and which abuts with its end remote from the clamping end against parts of the belt at the side of the belt which is directed away from the side of the belt against which the clamping end abuts.

It is possible thereby to obtain a good connection of the clamping means, with a compact construction of the combination of the belt and the clamping means, when a flat connecting piece joins the part of the clamping means which is located at the side of the belt remote from the clamping end, said connecting piece abutting against the same side of the belt as the clamping end. It is possible thereby to realise a good positioning and connection between the clamping means and the belt when the connecting piece at its free end is provided with a folded-over edge, which is accommodated in a hole provided in the belt.

It is i.a. this construction which provides a further great advantage of the construction according to the invention, viz. that the clamping means are detachably connected with the belt. Such a detachable connection of the clamping means with the belt has important advantages. In the first place the belt and the clamping means can be produced independently, which considerably facilitates the production of said various parts, e.g. in comparison with the manufacture of a construction such as the one disclosed in U.S. Pat. No. 3,643,670. Besides that it will be easy to replace the clamping means in case they are damaged, without it being necessary to replace an entire belt including clamping means, as may be necessary when the belt and the clamping form an integrated piece. Also it will be easy to exchange the clamping means for clean ones in case of a build-up of material on the clamping means, and/or to clean the clamping means after removal from the belt.

Furthermore this has made it possible to make the belt and the clamping means of different materials.

Thus it is e.g. possible to make the belt of a conductive material and at least partly coat it with a non-conductive material, in such a manner that the strip-shaped elements can be pressed against the non-coated parts of the belt by means of the clamping means. This may prevent the build-up of material, at least on those parts of the belt that are coated with a non-conductive material.

Another possibility is to make the belt of a non-conductive material, whilst the clamping means are made of a conductive material. The clamping means will have to be suitable connected with a D.C. power source during operation. Also here a build-up of material on the belt will be prevented, whilst the clamping means, on which a build-up of material may take place, can be easily replaced and/or be cleaned after they have been detached from the belt.

A further aspect of the invention relates to a method of treating strip-shaped elements, wherein said elements are coupled to an endless belt passed over two guide wheels, said belt being equipped with resilient clamping means, said resilient clamping means with their free ends making contact with the strip-shaped elements in order to clamp said strip-shaped elements against the belt.

With the method which can be derived from U.S. Pat. No. 4,534,843 the strip-shaped elements are pressed between the co-operating clamping means in a direction perpendicular to the longitudinal direction of the endless belt. When such a method is used only comparitively short strip-shaped elements can be treated.

According to the invention the free ends of the clamping means are moved at a supply point of the strip-shaped elements located near a guide wheel, and also at a discharge point of the strip-shaped elements located near a second guide wheel, transversely to the belt as well as parallel to the belt along some distance, whilst the strip-shaped elements are supplied or discharged parallel to the direction of movement of the belt, near the supply and discharge points.

As a result of the movement of the free ends of the clamping means in a direction parallel to the belt the relevant ends of the clamping means are positioned beyond reach of a strip-shaped element supplied at the location of a guide wheel, parallel to the direction of movement of the belt, whilst said strip-shaped element is moving at least substantially tangentially relative to the guide wheel arranged near the supply point. By thus creating the possibility of supplying strip-shaped elements parallel to the direction of movement of the belt it has also become possible to supply or discharge strip-shaped elements formed by elongated webs, unwound from and wound onto reels during the treatment, continuously to the apparatus or from the apparatus, as the case may be.

The invention will be further explained hereinafter with reference to a few embodiments of the apparatus according to the invention illustrated in the accompanying figures.

FIG. 1 is an elevational view of a strip-shaped element to be treated in the shape of a cut-out metal frame with parts embedded in a plastic material.

FIG. 2 is a bottom view of FIG. 1.

FIG. 5 is a view of a part of and endless belt of the apparatus according to FIG. 3, and of clamping means connected with and co-operating with said belt.

FIG. 6 is a cross-section of the belt, with a strip-shaped element secured thereto.

FIG. 7 is a cross-section of the belt without strip-shaped element.

FIG. 14 is an elevational view, corresponding with FIG. 11, of a part of a belt with clamping means co-operating therewith according to a further embodiment.

FIG. 15 is a cross-section of FIG. 14.

FIG. 16 is a larger-scale elevational view of a part of the belt and the lips of the clamping means co-operating therewith, as well as of a part of a strip-shaped element clamped onto said belt.

As is illustrated in FIGS. 1 and 2 a strip-shaped element to be treated may take the form of a stamped strip of frames 1, certain areas of which are encapsulated in plastic material 2.

For cleaning and/or plating with a suitable metal such strip-shaped elements are usually led through one or more baths, as is also described in the above-mentioned U.S. Pat. No. 4,534,043 or Dutch Pat. No. 150,860. According to the invention this may take place by using an apparatus such as illustrated in the FIGS. 3–7.

Figure 3:
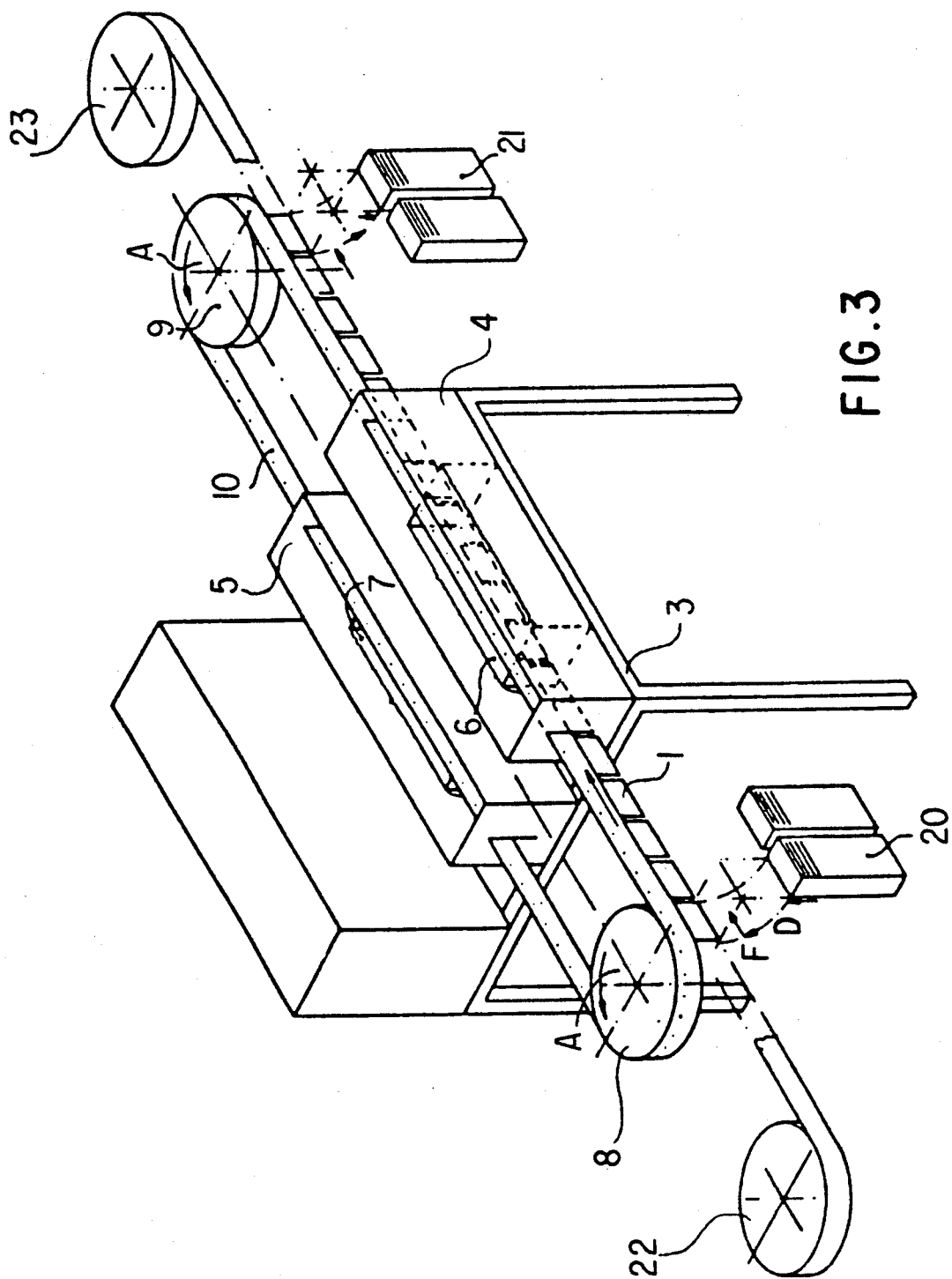
FIG. 3 is a diagrammatic perspective illustration of a first embodiment of an apparatus according to the invention.

As is illustrated in FIG. 3 said apparatus comprises a frame 3 on which there are placed two containers 4 and 5, in which there are placed one or more treatment tanks 6 and 7 respectively.

The apparatus is furthermore provided with a pair of guide wheels 8 and 9, over which an endless belt 10 is passed. At least one of the wheels 8 or 9 is connected with a driving source (not shown), by means of which the wheels can be driven in the direction according to the arrow A, and with it the belt can be driven in a direction according to the arrow B.

As is illustrated in more detail in FIGS. 4–7 the endless belt 10, preferably made of a metal, is provided with a plurality of regularly spaced, substantially rectangular openings 11, which are slightly narrower at their upper ends, seen in FIG. 5, than along the remaining part of their height, so that stop notches 12, projecting into the openings 11, are formed in the upper corners of said openings 11. At some distance above each opening 11 there is furthermore provided a slotted hole 13 in the belt.

Near each opening 11 a resilient clamping means 14, which is made of a leaf-spring material, is connected with the belt.

As appears in particular from FIGS. 5–7 said clamping means comprises a flat coupling part 15, whose upper end 16 is bent over perpendicularly. A curved part 17, which is slightly wider than the part 15, the width of said part corresponding with the width of an opening 11, joins the lower end of said flat coupling part 15. A lip 18 or clamping end, located in the extension of the flat coupling part 15, joins the edge of the curved part 17 remote from the coupling part 15.

For attaching a resilient clamping means to the belt 10 the curved part 17 is pressed through an opening 11 provided in the belt 10, whilst said curved part is deformed such that the ends of the upper edge of the curved part 17 projecting from the part 15 will come to lie at the rear side of the belt, against the stop notches 12, seen in FIG. 5. The bent-over edge 16 at the upper end of the connecting part 15 is furthermore inserted in a slotted hole 13.

The construction of the resilient clamping means is thereby such that when the clamping means is thus connected with the endless belt 10, the lip 18 will be pressed against the lower edge of the belt 10 with a certain force under the influence of the resilience of the clamping means itself. Consequently it is possible to clamp a strip-shaped element, such as e.g. the metal frame illustrated in FIGS. 1 and 2, with its upper edge between the lower edge of the metal belt and a number of lips 18, as is illustrated in FIG. 6, whereby the lips 18 will press the upper edge of said metal frame firmly against the flat belt 10, and whereby no undesired deformations of the upper edge of the frame 2 will occur.

For inserting the strip-shaped element between the lips 18 of the resilient clamping means and the belt 10 or removing said element from this position it is only necessary to push the lips 18 away from the belt, e.g. by exerting a force on the curved parts 17 of the springs in the direction according to arrow C, as is illustrated in FIG. 7.

As is illustrated the lips or clamping ends 18 are not only moved in a direction perpendicular to the belt 10 along a distance "a" thereby, but also in a direction parallel to the belt along a distance "b". Said latter moving of the clamping ends 18 is important, because as a result of this a supply and/or discharge of elements parallel to the direction of movement of the belt becomes possible, as will be described in more detail hereinafter.

Figure 4:
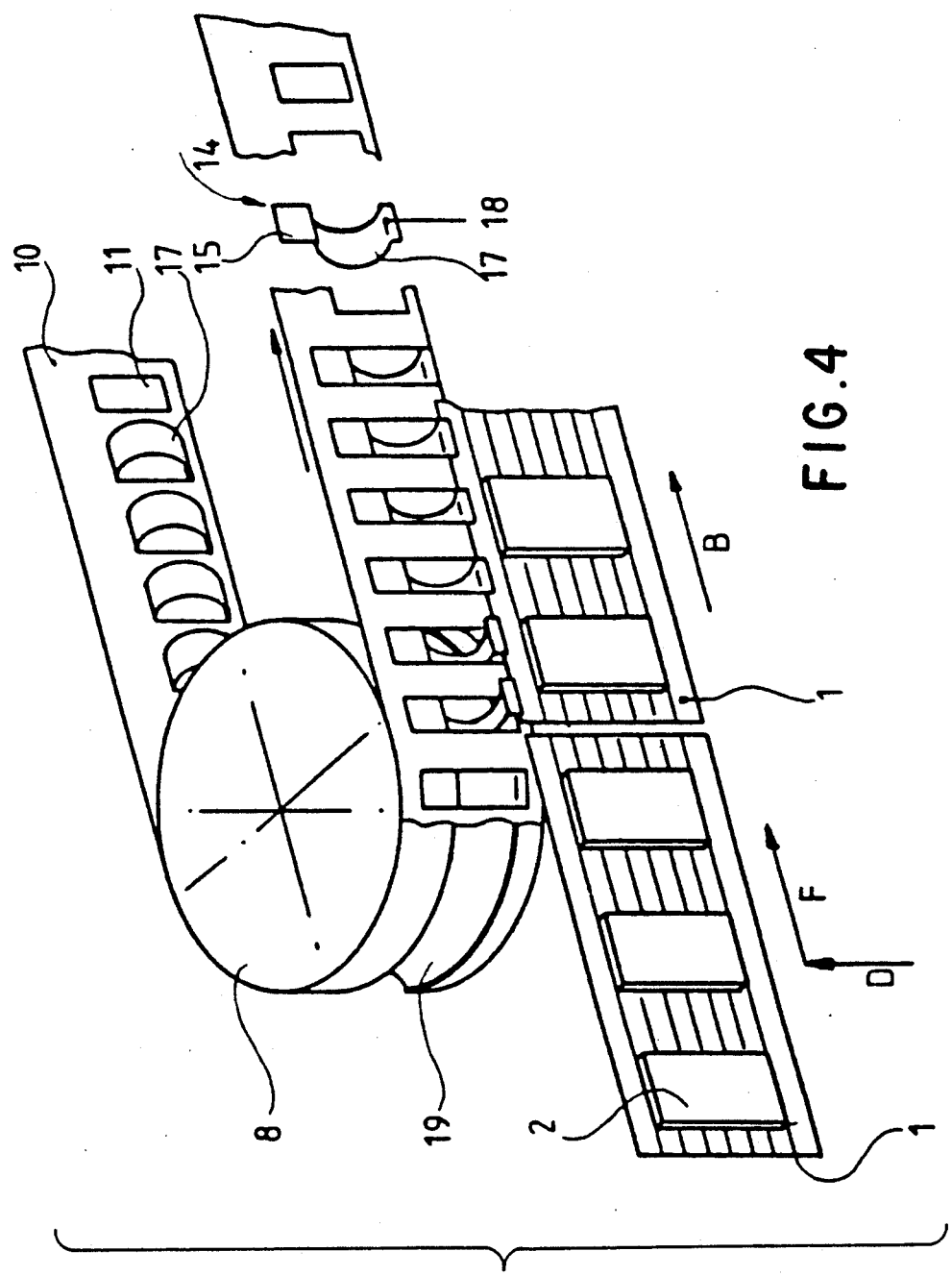
FIG. 4 is a larger-scale perspective illustration of a part of the apparatus illustrated in FIG. 3, with a few strip-shaped elements.

In order to effect said movement of the lips 18 from the belt 10 the guide wheel 8, as well as the guide wheel 9, for the belt 10 are provided with a circular groove 19 in the embodiment illustrated in the FIGS. 3 and 4, the section of said circular groove 19 being adapted to the curved form of the part 17 of the resilient clamping means 14, but with such a depth and shape that when the curved parts 17 run into the grooves 18 when the belt 10 is moved, the lips 18 are pushed away from the belt and slightly upwards in order to make it possible to feed or remove strip-shaped elements.

As is furthermore illustrated in FIG. 3 strip-shaped elements can be supplied near the guide wheel 8 from a magazine 20, e.g. one at a time. Said strip-shaped elements can be taken out of the magazine, e.g. one at a time, by means of an operating arm which is pivotable in the direction according to the arrow D and which can move to and fro in the direction according to the arrow F, said operating arm being equipped with a gripper, e.g. a suction cup, in which a sub-atmospheric pressure can be generated in order to be able to effect attachment between the arm and the strip-shaped element to be moved. Of course the movement of the operating arm is synchronous with the movement of the belt. After a strip-shaped element has been taken out of the magazine 20 said element can be pivoted upwards in the direction indicated by the arrow D and then be moved along with the belt in the direction according to the arrow F (FIG. 4) in order to effect the insertion of the upper edge of the strip-shaped element between the belt 10 and the lips 18 which are pushed away from the belt. From FIG. 4 it will be apparent that the resilient clamping means, after having passed the wheel 8, will return to the position in which the lips 18 clamp a strip-shaped element supplied on the belt 10, so that the elements are carried along in the direction according to the arrow 8 by means of the belt 10, in order to be thus led through one or more baths 6. After having passed said baths the belt with the strip-shaped elements supported by the belt will reach a position near the wheel 9, where the lips 18, as a result of the co-operation between the resilient clamping means and the wheel 9, are pushed in a direction away from the belt, as a result of which the strip-shaped elements are cleared from the belt again.

The strip-shaped elements can be gripped by a conveyor (not shown) which, in a similar manner as the conveyor used for the supply of the strip-shaped elements, can move to and fro in the longitudinal direction of the part of the belt between the wheels 8 and 9, and which can pivot in the direction of a magazine 21, in which the strip-shaped elements can be stacked after treatment.

After having passed the wheel 9 the belt is moved through a bath 7 for cleaning the belt prior to providing new strip-shaped elements to be treated.

As is furthermore diagrammatically illustrated in FIG. 3 it is also possible to treat a single elongated strip-shaped element in the shape of an elongated web instead of short strip-shaped elements such as illustrated in the FIGS. 1 and 2, by means of the apparatus according to the invention, whereby the web can be unwound from a reel 22 and be rewound on a reel 23 again after having been treated.

The movement of the strip-shaped elements to be treated can take place continuously or step and repeat during operation, as desired.

In the apparatus according to FIG. 3 the strips are supplied tangentially relative to the guide wheel. It is also conceivable, however, to push the lips 18 of a number of clamping means located side by side away from the belt, e.g. by means of a mechanism arranged beside the wheel 8, whereby a strip-shaped element may be supplied from below.

Preferably the strip-shaped elements are connected with the belt in such a manner that the facing ends are located closely together, in order to prevent an excessively thick deposit of metal on said ends, deviating from the average thickness of the deposit along the length of the strip-shaped elements.

Figure 8:
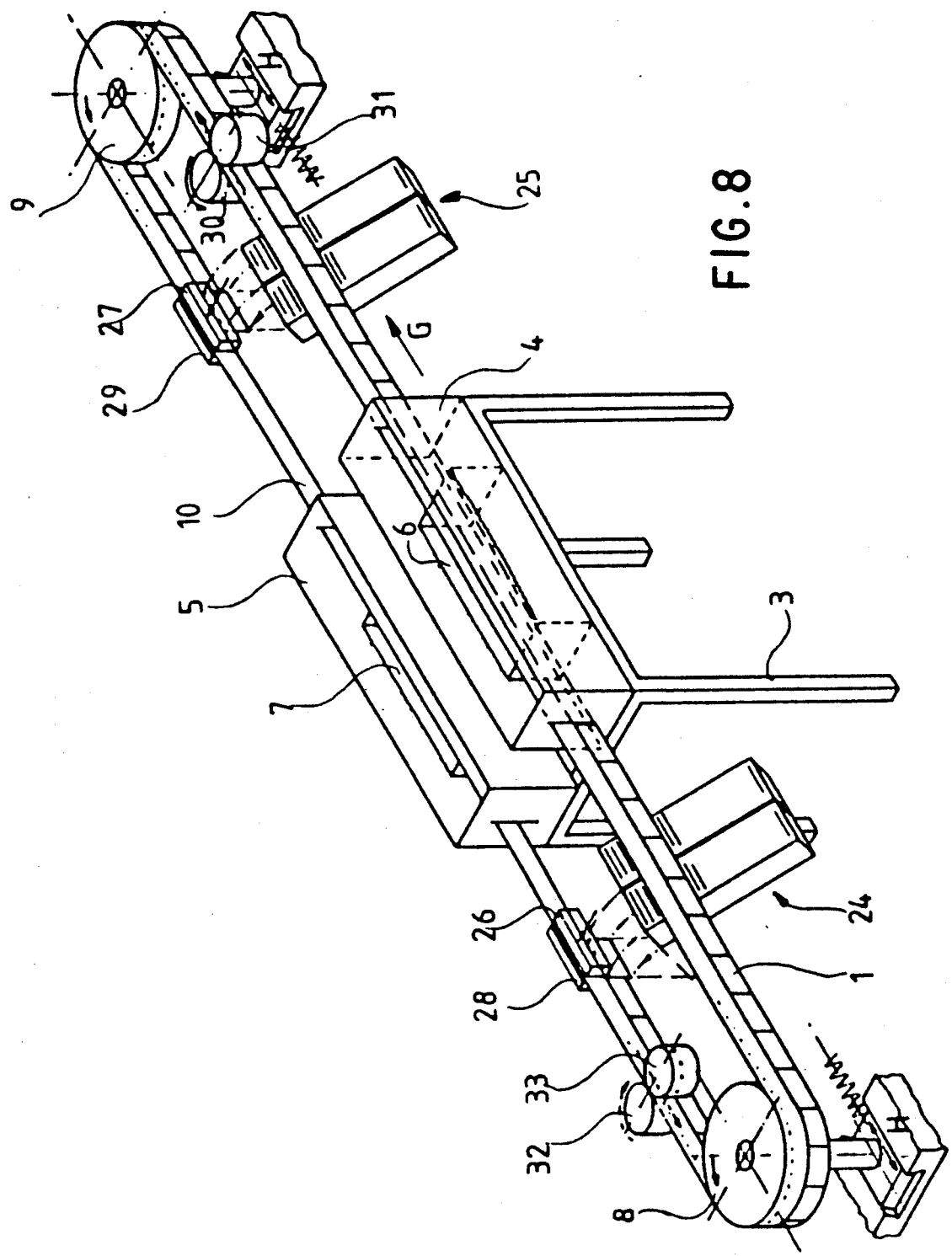
FIG. 8 is a diagrammatic, perspective illustration of a second embodiment of an apparatus according to the invention.

The apparatus illustrated in FIG. 8 largely corresponds with the apparatus illustrated in FIG. 3, and corresponding parts have been given corresponding reference numbers in both Figures, therefore.

In this apparatus pushing means 26 and 27 respectively, movable transversely to the longitudinal direction of the belt, are arranged near a loading station 24 as well as near an unloading station 25. When said pushing means 26 and 27 are pressed towards the belt by means of a mechanism (not shown), they will engage the curved parts 17 of the resilient clamping means connected with the belt, and move said resilient clamping means relative to the belt in order to clear the lips 18 from the lower edge of the belt. In order to prevent undesired bending of the belt guide blocks 28 and 29 respectively are arranged at the sides of the belt remote from the pushing means 26 and 27. It will be apparent that said guide blocks 28 and 29 will be constructed in such a way that they do not prevent the lips 18 from being pushed away from the belt.

Near wheel 9 a pair of pinch rollers 30 and 31 are provided, which are arranged on both sides of the part of the belt extending between the wheels 8 and 9, by means of which pinch rollers the front part of the belt 10 located between the wheels 8 and 9, seen in FIG. 8, is continuously driven at a uniform speed in the direction according to the arrow G during operation.

Near wheel 8 pinch rollers 32 and 33 are provided, said pinch rollers co-operating with the rear part of the belt 10, seen in FIG. 8, by means of which said rear part can be driven intermittently. Said intermittent driving of the rear part is necessary in order to make it possible for strip-shaped elements to be provided or removed, as the case may be, in the loading and unloading stations 24 and 25, during the time that the belt is stationary.

Instead of the pinch rollers 32 and 33 also other driving means may be used, e.g. clamps which can be moved to and fro in the longitudinal direction of the belt part, said clamps carrying the belt 10 along with a forward stroke and returning clear of the belt with a return stroke.

Loading in the loading station can take place by means of a pivotal means, movable upwards and downwards, by means of which the strip-shaped elements, one at a time, can be taken out of a magazine arranged in the loading station 24 and pivoted to a position in which the upper edge of the strip-shaped element is located under the pushed away lips by means of the block 26, after which the strip-shaped element can be moved slightly upwards in order to reach a position between the lips and the belt with its upper edge. Then the block 26 will be retracted so that the lips will clamp the strip-shaped element to the belt. Removing the strip-shaped elements can take place in reverse order in the unloading station 25.

In order to make it possible that the rear part, seen in FIG. 8, moves intermittently, the guide wheels 8 and 9 can move against spring force in the longitudinal direction of the belt, as is diagrammatically indicated by means of double arrows H.

When the rear part, seen in FIG. 8, of the belt 10 is stopped for loading and/or unloading by means of the pinch rollers 32 and 33 or the like, the guide wheels 8 and 9 will move to the right, seen in FIG. 8, whilst the front part of the belt 10 will keep on moving in the direction of the arrow G at the intended uniform speed.

When the rear part of the belt 10 is driven again the rollers 32 and 33 or the like are driven such that the movement of the rear part is accelerated, in order to return the wheels 8 and 9 to their starting position again whilst the intended uniform speed of the front part is maintained.

Figure 9:
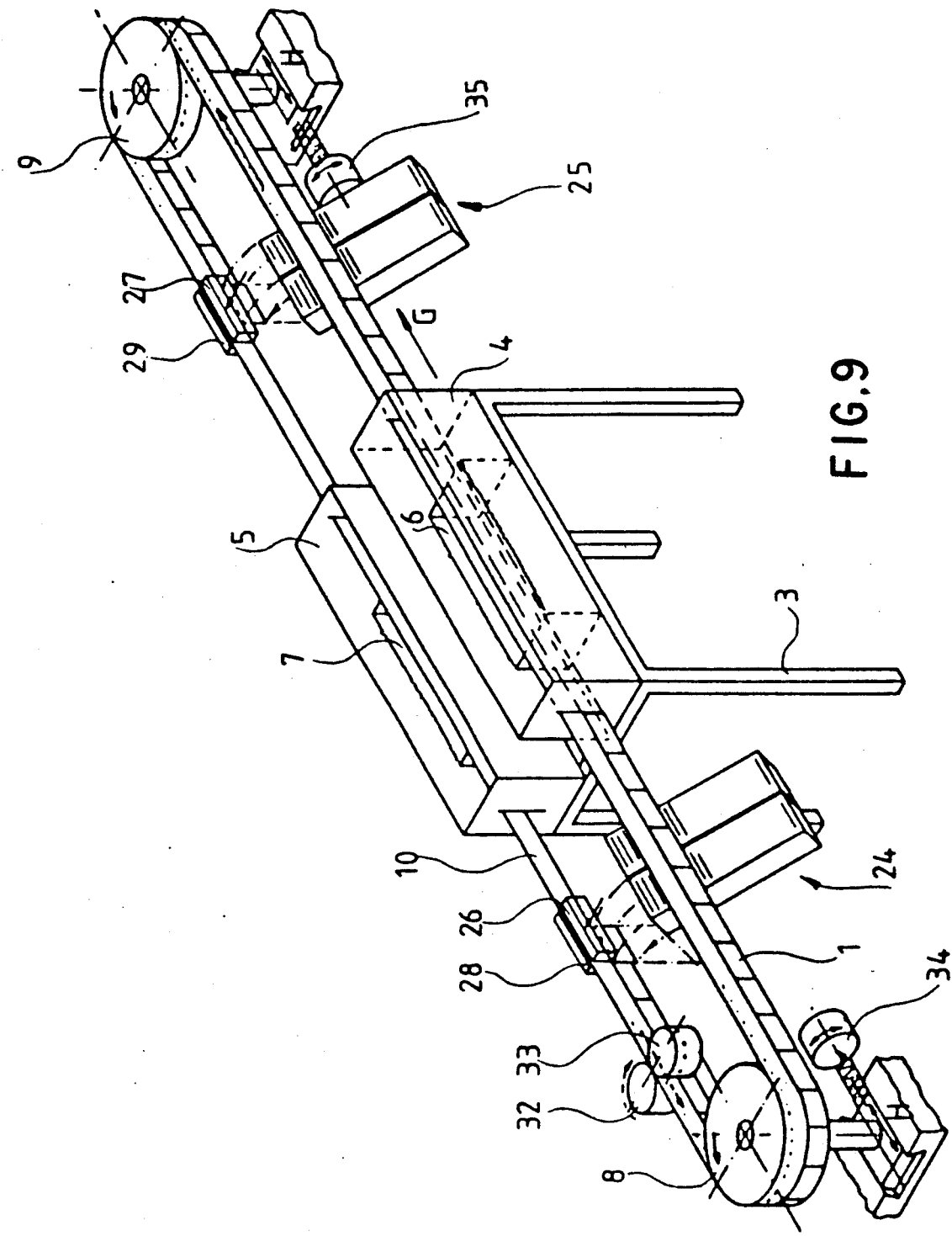
FIG. 9 is a diagrammatic, perspective illustration of a third embodiment of an apparatus according to the invention.
Figure 10:
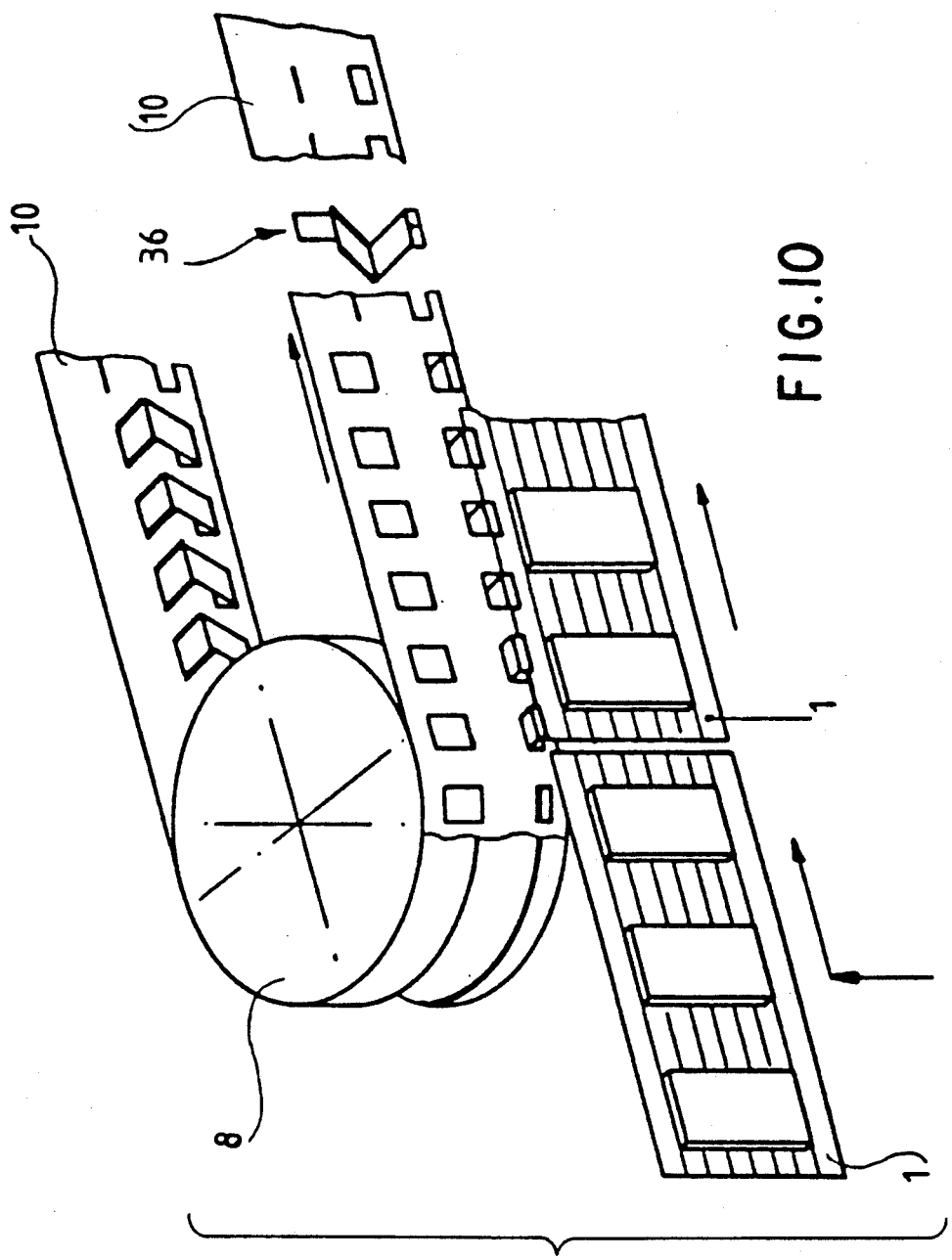
FIG. 10 is a diagrammatic, perspective illustration, corresponding with FIG. 4, of a further embodiment of the construction according to the invention.

The apparatus illustrated in FIG. 9 at least substantially corresponds with the apparatus in FIG. 8, and consequently corresponding parts have been given corresponding reference numbers in the FIGS. 8 and 9.

In the embodiment illustrated in FIG. 9 the driving rollers 30 and 31, which are arranged near the wheel 9 in the embodiment according to FIG. 8, have been left out. Instead diagrammatically illustrated driving means 34 and 35 are provided, by means of which the guide wheels 8 and 9 can be positively moved to and fro in the longitudinal direction of the endless belt. As in the embodiment according to FIG. 8 the front part of the endless belt, seen in FIG. 9, of the embodiment according to FIG. 9 can be moved continuously in the direction of the guide wheel 9, in such a way that the belt speed of the front part, in the direction indicated by the arrow G, is constantly uniform, whilst the rear part of the belt, seen in FIG. 9, is moved intermittently in the direction of the guide wheel 8.

During the period that the rear part of the belt is kept stationary the guide wheels 8 and 9 are moved towards the right, seen in FIG. 9, by means of the relevant driving means 34 and 35, at a speed which is equal to half the speed of the endless belt 10. During the period that the rear part of the belt is driven said rear part is driven at a larger speed than the intended uniform speed of the front part which is to be maintained, and the guide wheels 8 and 9 are simultaneously moved towards the left, seen in FIG. 9, to their starting position.

The advantage of the apparatus according to FIG. 9 with respect to the apparatus according to FIG. 8 is that in the former apparatus it can always be effected that the driving wheels 8 and 9 return to a certain starting position, whilst in an apparatus according to FIG. 8 it may happen that after a prolonged period of use the guide wheels 8 and 9 with the belt passing thereover will start to creep from their original starting position in one direction or another, as a consequence of the rollers 30, 31 and 32, 33 not being driven synchronously.

Of course variations and/or additions to the constructions described above are conceivable within the spirit and scope of the invention.

In the further embodiments to be discussed hereafter, which are illustrated in FIGS. 11–18, those parts that correspond with parts already discussed above have been given the same reference numbers as in the preceding Figures.

As is illustrated in the Figures use is made in this embodiment of a resilient clamping means 36 made of a leaf-spring material, said clamping means comprising a pair of parts 37 and 38 including an acute angle with each other, which parts are located at the side of the belt opposite the strip-shaped elements when they are attached to the belt. A lip 39 corresponding with the above-mentioned lip 18 joins the end of the part 38 remote from the part 37, by means of which lip 39 an edge of a strip-shaped element 1 can be clamped onto the belt 10 in a manner similar to the one described above.

The end of the part 37 remote from the part 38 is connected, via a connecting part 40 extending perpendicularly to the belt 40 and extending through a slotted hole 13 provided in the belt 10, with a coupling part 41 extending upwards from said connecting part 40, said coupling part 41 abutting against the side of the belt directed towards the strip-shaped elements 1.

Figure 13:
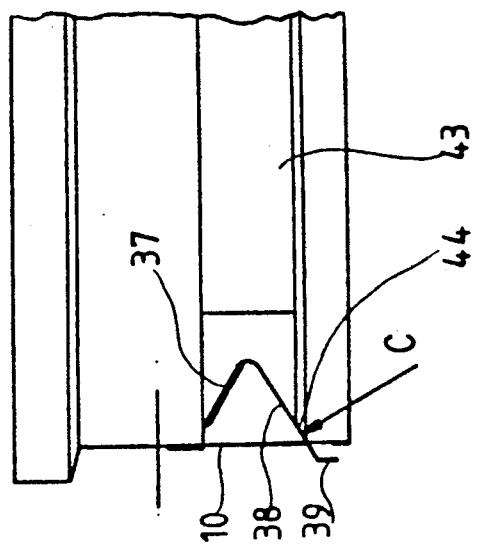
FIG. 13 is a larger-scale illustration of a part of the guide wheel illustrated in FIG. 10, with a belt with a clamping means passed over said wheel.
Figure 12:
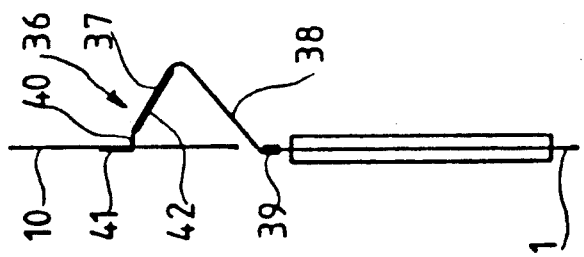
FIG. 12 is a cross-section of the belt illustrated in FIG. 11, with a strip-shaped element clamped on said belt.
Figure 11:
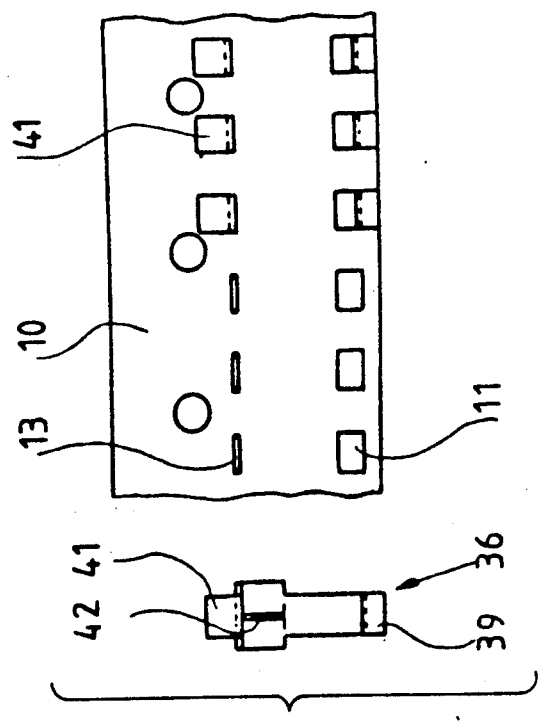
FIG. 11 is an elevational view of a part of an endless belt of the apparatus according to FIG. 10, and of clamping means connected with and co-operating with said belt.

As is furthermore illustrated in the FIGS. 11-13 a recessed part 42 extending in the longitudinal direction of the part 37 is formed in the centre of said part 37, in order to enhance the rigidity of said part 37.

As furthermore appears in particular from FIG. 13 a circular groove 43 having a substantially rectangular section is provided in the wheel 8 (or 9) in this embodiment, whereby the lowermost boundary plane of said groove near the circumference of the wheel is provided with a bevelled edge 44 for co-operation with the part 38 of the resilient clamping means 36, for pushing the legs 38 upwards again, in the direction according to the arrow C, when the resilient clamping means 36 run into the groove 43, in order to make room for feeding the strip-shaped elements 1 tangentially relative to the wheel 8. Said movement of the part 38 and in particular of the lip 39 in an upward direction and remote from the belt 10 is influenced advantageously by the greater rigidity of the part 37 with respect to the rigidity of the part 38, this is also effected by providing the above-mentioned recessed part 42 in the part 37 of the resilient clamping means 36.

The resilient clamping means 45 illustrated in the FIGS. 14 and 15 has a part 47 which slopes upwards behind the belt 10 from the lip 46 which is located at the front side of the belt 10 and which cooperates with the strip-shaped elements 1 to be clamped, said part 47, via a curved part 48, blending into a part 49 which is wider than the part 47, said part 49 extending at least substantially perpendicularly to the plane of the belt 10. A connecting part 50, which is passed along the front side of the belt and through a slot 13, joins the free end of said part 49.

As is illustrated in more detail in FIG. 16 the lips 46 are slightly curved, sen in section, so that the lips abut against a strip to be clamped with only two boundary edges extending perpendicularly to the longitudinal direction of the belt, as a result of which a good pressure of the strip 1 against the belt 10 is ensured.

Figure 18:
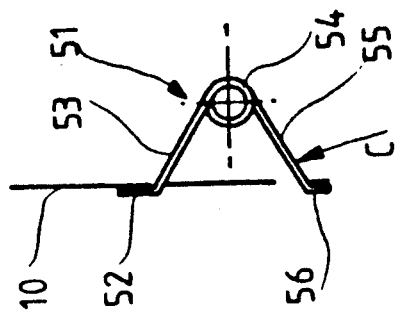
FIG. 18 is a cross-section of FIG. 17.
Figure 17:
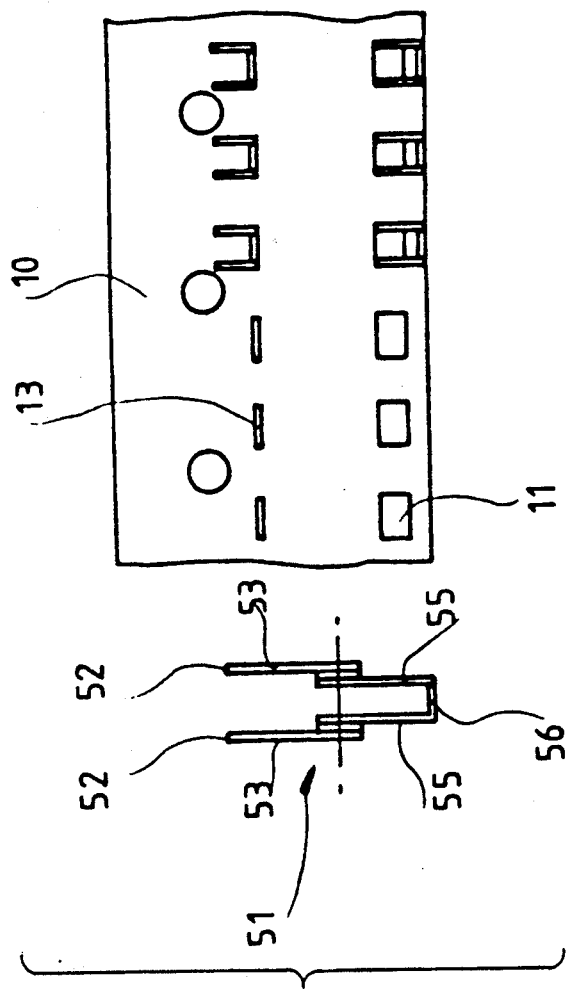
FIG. 17 is an elevational view of a part of a belt and resilient clamping means co-operating therewith according to a further embodiment.

As is furthermore illustrated in FIGS. 17 and 18 the resilient clamping means may also be bent of a wire-shaped resilient material, instead of a leaf-spring material. In the illustrated embodiment the clamping means 51 made of a wire-shaped resilient material comprises a pair of ends 52 abutting against the side of the belt directed towards the products 1 to be processed, said ends joining legs 53 extending parallel to each other and being passed through a slot 13 provided in the belt 10. The ends remote from the free ends 52 each join a few coils 54, whose central axis extends parallel to the longitudinal direction of the belt 10. Via said coils 54 the legs 53 are connected with further legs 55 sloping downwards again from the coils 45 in the direction of the belt, whereby the arrangement is such that the legs 53 and 55 include an acute angle with each other, seen in said view (FIG. 18).

The ends of the legs 55 remote from the coils 54 are passed through an opening 11 provided in the belt 10 and join a U-shaped wire part connecting the two legs, said wire part abutting against the lower edge of the belt.

It will be apparent, that said U-shaped part 56 will perform the same function as the lips, abutting against the lower edge of the preceding Figures. Said U-shaped elements 56 can thereby be pushed upwards again, in a direction remote from the belt, by exerting a force on the legs 55 in the direction according to the arrow C by suitable means.

Usually the belt is made of a conductive material with apparatus of the above kind. The springs are preferably made of a non-conductive material thereby, e.g. a plastic material, in order to prevent a build-up of metal on the resilient clamping means from the bath in which the strip-shaped elements are plated.

In order to further prevent the build-up of such material on the belt 10 said belt, when made of a conductive material, may be at least partly coated with a layer of a non-conductive material, such that the strip-shaped elements are in good contact with the conductive material of the belt.

An important advantage of the apparatus described above is furthermore that the clamping means are detachably connected with the endless belt, so that said clamping means can be easily replaced in case of damage or of the possible build-up of material.

It is especially advantageous to use a belt of a non-conductive material in combination with easily exchangeable clamping means of a conductive material. The clamping means can be easily removed and/or exchanged in order to make it possible to remove any material which has built up on the clamping means, after which the clamping means are suitable for renewed use, whilst there will be at least substantially no build-up on the belt.

Figure 19:
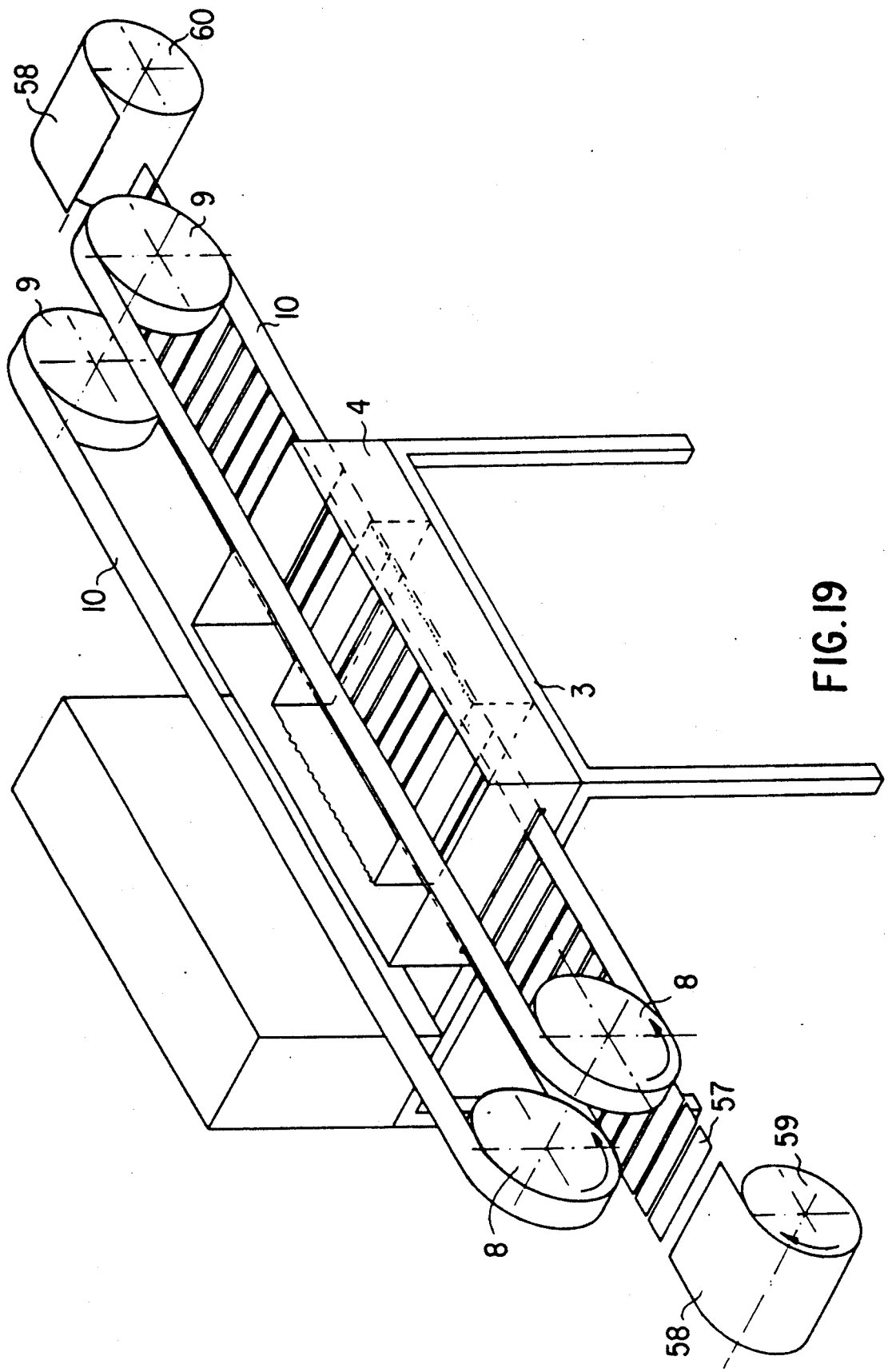
FIG. 19 shows an apparatus according to the invention, said apparatus being suitable for horizontal transport of the elements.

As is illustrated in FIG. 19 use may also be made of an apparatus provided with a pair of belts 10, which are passed, in a similar manner as explained above, over guide wheels 8 and 9. The construction of the parts 8-10 may thereby correspond with the embodiments described above.

As appears from FIG. 19 the two guide wheels 8 as well as the two guide wheels 9 are thereby pivoted about a common axis of rotation and the parts of the belts that are spaced from each other by some distance extend in horizontal direction. By means of such an apparatus it is possible to process e.g. strips 57 having a desired length, whereby said strips can be supplied by means of a suitable supply mechanism, such that the ends of the strips will be gripped by means of the resilient clamping means, all this in a manner such as described above with reference to the preceding embodiments. Of course it is also possible to process e.g. plates, tapes of foil or the like. Also strip stock can be effectively processed with the apparatus according to FIG. 19, whereby strip stock 58 can be unwound from a reel 59 near one end of the apparatus, and carried along with the two belts 10 whilst the side edges of the strip stock are clamped on the belts 10, and be wound on a reel 60 again near the other end of the apparatus.

FIG. 19 diagrammatically illustrates the use of two guide wheels 8 and 9 respectively, which are spaced from each other by some distance. As is illustrated in FIG. 20, however, it will also be possible to use a single guide wheel 8' or 9' for guiding the two belts 10.

Figure 20:
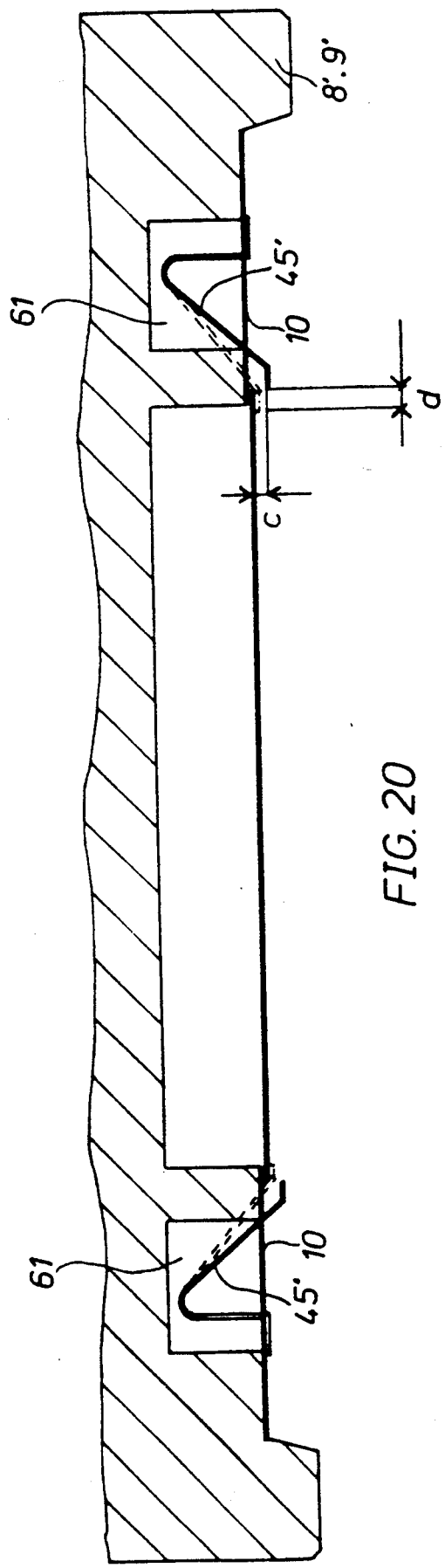
FIG. 20 shows a part of a cross-section of FIG. 19.

As is further indicated in FIG. 20 circular grooves 61 are provided in the guide wheel 8' or 9' in this embodiment as well, for the operation of the clamping means 45', which have at lest substantially the same construction as the clamping means illustrated in the FIGS. 14 and 15. Also in this embodiment the construction is such that the free clamping end of a resilient element is not only moved in a direction c perpendicularly to the plane of the relevant belt, but also in a direction parallel to the plane of the relevant belt 10, in order to make it possible that material to be processed is fed in a direction coinciding with the direction of movement of the belt.

Figure 21:
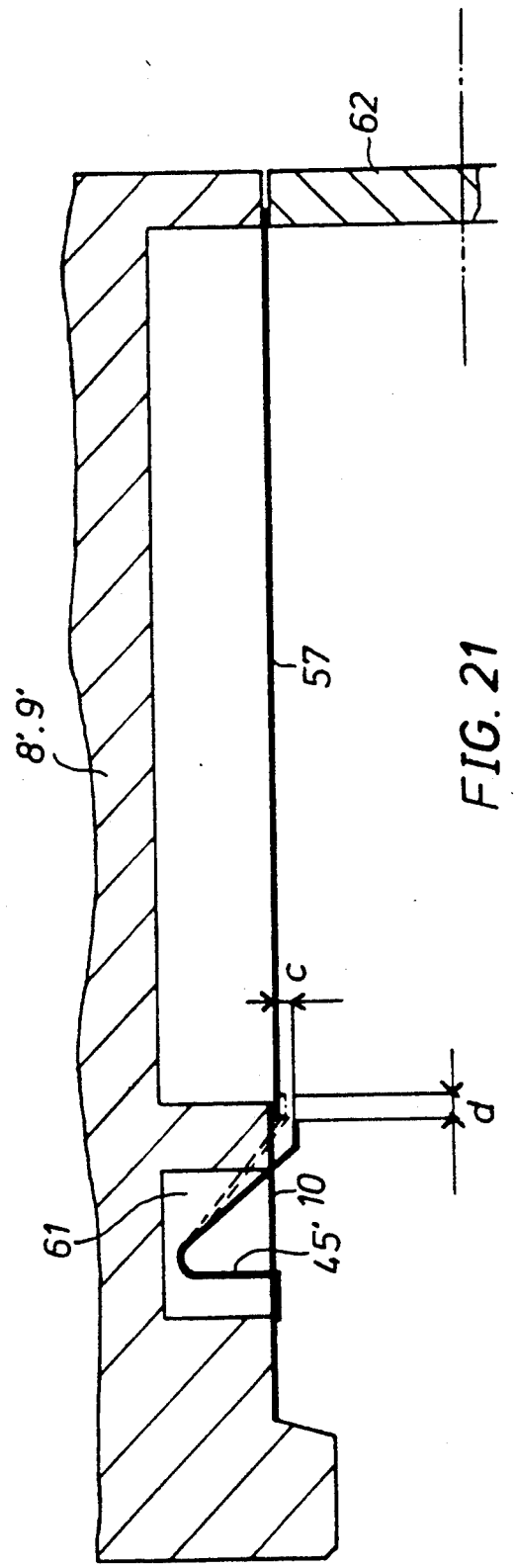
FIG. 21 is a cross-section, corresponding with FIG. 20, of a variant of the apparatus illustrated in FIG. 19.

FIG. 21 shows another variant of the embodiment according to FIG. 20. Corresponding parts have been given corresponding reference numbers in said FIGS. 20 and 21.

As will be apparent from FIG. 21 a product to be moved in a horizontal position is only clamped near one boundary edge hereby. At the opposite boundary edge the product in question is supported by one or more guide means 62, which may e.g. be formed by rollers, a guide strip extending in the direction of movement of the product, a supporting strip moving along with the product etc.

The FIGS 19-21 illustrate an apparatus wherein the strip-shaped elements to be processed, such as constituted by short or long strips, plates, tape of foil, strip stock and the like, are supported at two opposite edges and moved in a substantially horizontal direction. It will be apparent, however, that such a construction wherein the products are supported at two opposite edges can also be realised for an embodiment wherein the products are moved in vertical position.

We claim:

1. Apparatus for treating strip-shaped elements (1), said apparatus being provided with an endless belt (10) with resilient clamping means (14, 36, 45, 51) for clamping strip-shaped elements (1) on the endless belt (10), such that the strip-shaped elements (1) can be led through one or more treatment baths, characterized in that resilient clamping means (14, 36, 45, 51) are each connected near one end (16, 41, 50, 52) with the endless belt, and with their other free clamping end (18, 39, 46, 56) abut against the belt under the influence of their own resilience, whilst near one loading and/or unloading station the apparatus comprises means (8, 9) by means of which the free clamping ends (18, 39, 46, 56) of the clamping means can be pushed in a direction remote from the belt.

2. Apparatus according to claim 1, characterized in that a clamping means (14, 36, 45, 51) has between its ends a part (17; 37; 38; 47-49; 53-55) located at the side of the belt (10) remote from the clamping end (18, 37, 46, 56), said part comprising parts including an angle with each other, whereby at least one of said parts projects through an opening (11) provided in the belt, whilst the free clamping end (18, 39, 46, 56) of the clamping means (14, 36, 45, 51) is formed by a part joining the part projecting through the opening (11), said part abutting against the belt (10).

3. Apparatus according to claim 2, characterized in that the end of the part (17; 37; 38; 47-49) of the clamping means (14, 36, 45,) which is directed away from the clamping end (18, 39, 46) and which is located at the side of the belt remote from the clamping end (18, 39, 46) is wider than a part (15, 41, 50) joining said part, which is connected with the belt and which abuts with its end remote from the clamping end (14, 36, 45, 51) against parts of the belt (10) at the side of the belt which is directed away from the side of the belt against which the clamping end (18, 39, 46) abuts.

4. Apparatus according to claim 3, characterized in that a flat connecting piece joins the part of the clamping means (14, 36, 45, 51) which is located at the side of the belt (10) remote from the clamping end, said connecting piece abutting against the same side of the belt (10) as the clamping end.

5. Apparatus according to claim 4, characterized in that the connecting piece (15) is at its free end provided with a folded-over edge (16), which is accommodated in a hole (13) provided in the belt (10).

6. Apparatus according to claim 4, characterized in that the connecting piece (41, 50), via a slotted hole (13) provided in the belt, joins the part (37, 38; 47-49) of the clamping means located at the other side of the belt.

7. Apparatus according to any one of the preceding claims, characterized in that the part (17) of the resilient clamping means (19) located at the side of the belt (10) remote from the clamping end (18) is curved along at least part of its length.

8. Apparatus according to any one of claims 1-6, characterized in that the part of the resilient clamping means (36) located at the side of the belt (10) remote from the clamping end (39) comprises at least two parts (37, 38) including an acute angle with each other.

9. Apparatus according to claim 8, characterized in that a part (42) of one (37) of the parts mentioned is recessed in order to enhance the rigidity of said part (37).

10. Apparatus according to any one of claims 1-6, characterized in that a clamping means (14, 36, 45,) is made of a leaf-spring material.

11. Apparatus according to any one of the preceding claims 1-6, characterized in that a clamping means (51) is made of wire-spring material.

12. Apparatus according to claim 11, characterized in that at least one coil (54) is provided in the part of the clamping means (51) which is located at the side of the belt (10) remote from the clamping end (56), the central axis of said coil extending at least substantially parallel to the longitudinal direction of the belt (10).

13. Apparatus according to any one of claims 1 -6, characterized in that the endless belt (10) is passed over guide wheels (8, 9) in which there are provided grooves (19, 43), which co-operate with the parts (17; 37, 38; 47-49; 53-55) of the clamping means (14, 36, 45, 51) located at the side of the belt (10) opposite from the clamping end (18, 39, 46, 56), whereby the grooves (19, 43) are dimensioned such that when a relevant part (17; 37, 38; 47-49; 53-55) of a clamping means runs into the groove the clamping end (18, 39, 46, 56) is pushed away from the belt.

14. Apparatus according to any one of claims 1-6, characterized in that the clamping means (14, 36, 45, 51) are detachably connected with the belt (10).

15. Apparatus according to any one of claims 1-6, characterized in that the belt (10) is made of a conductive material and is at least partially coated with a non-conductive material, such that the strip-shaped elements (1) can be pressed against the non-coated parts of the belt (10) by means of the clamping means (14, 36, 45, 51).

16. Apparatus according to any one of the preceding claims 1-6, characterized in that the belt is made of a non-conductive material or is formed of a belt made of a conductive material and coated with a non-conductive material, whilst the clamping means (14, 36, 45, 51) are made of a conductive material.

17. Apparatus for treating strip-shaped elements (1), said apparatus being provided with an endless belt (10) with clamping means (14, 36, 45, 51) for clamping strip-shaped elements (1) on the endless belt (10), such that the strip-shaped elements (1) can be led through one or more treatment baths, characterized in that means (32, 33) are provided by means of which a part of the belt (10) passed over two guide wheels (8, 9) can be driven intermittently, whilst the two guide wheels (8, 9) are arranged to be movable to and fro in the longitudinal direction of the belt (10), all this in such a manner that the other part of the belt moves uniformly continuously during operation.

18. Apparatus according to claim 17, characterized in that driving means (34, 35) are provided, by means of which the guide wheels (8, 9) can be positively moved to and fro.

19. Apparatus according to any one of claims 17-18, characterized in that pushing means (16, 17), movable transversely to the longitudinal direction of the belt (10) are provided for moving the clamping ends (18, 39, 46, 56) of the clamping means (14, 36, 45', 51) co-operating with the belt (10).

20. Apparatus according to claim 19, characterized in that at the side of the belt (10) remote from a pushing means (16, 17) there is provided a guide means (28, 29) for the belt (10).

21. Apparatus according to claim 17, characterized in that the apparatus is provided with means (45', 62) for supporting the strip-shaped elements (56) near their boundary edge, which is directed away from the edge clamped to the belt (10) by means of the resilient clamping means.

22. Apparatus according to claim 21, characterized in that the supporting means are formed by a belt (10) equipped with clamping means (45').

23. Apparatus according to claim 21 or 22, characterized in that the belt (10) is passed over guide means rotatable about horizontal axes of rotation.

* * * * *